United States Patent [19]

Granström et al.

[11] Patent Number: 5,074,906
[45] Date of Patent: Dec. 24, 1991

[54] METHOD AND INSTALLATION FOR RECOVERING ENERGY IN METALLURGICAL PROCESSES

[75] Inventors: Staffan Granström, Sundsvall; Sten Holmlund, Växjö, both of Sweden

[73] Assignee: ABB Flakt AB, Nacka, Sweden

[21] Appl. No.: 566,419

[22] PCT Filed: Mar. 15, 1989

[86] PCT No.: PCT/SE89/00134

§ 371 Date: Aug. 30, 1990

§ 102(e) Date: Aug. 30, 1990

[87] PCT Pub. No.: WO89/08810

PCT Pub. Date: Sep. 21, 1989

[30] Foreign Application Priority Data

Mar. 16, 1988 [SE] Sweden .............................. 8800956

[51] Int. Cl.$^5$ .............................................. C22B 4/00
[52] U.S. Cl. .................................. 75/10.36; 75/10.34; 75/10.5
[58] Field of Search ...................... 75/10.34, 10.36, 10.5

[56] References Cited

U.S. PATENT DOCUMENTS

| | | | |
|---|---|---|---|
| 2,805,930 | 9/1957 | Udy | 75/10.34 |
| 2,830,890 | 4/1958 | Udy | 75/10.5 |
| 3,163,520 | 12/1964 | Collin | 75/10.38 |
| 3,224,871 | 12/1965 | Collin | 75/10.34 |
| 3,632,094 | 1/1972 | Longenecker | . |
| 4,375,958 | 3/1983 | Date et al. | . |
| 4,478,574 | 10/1984 | Okuno et al. | . |
| 4,619,693 | 10/1986 | Takai et al. | . |

*Primary Examiner*—Peter D. Rosenberg
*Attorney, Agent, or Firm*—Dann, Dorfman, Herrell & Skillman

[57] ABSTRACT

A method and an installation for recovering energy in the thermal destruction of pollutants in a gas emitted from a scrap preheating device (6,8), e.g. in an electro-steel furnace (1). The polluted gas is conducted through regenerative heat exchangers (12,15) before or after passing through a combustion chamber (4), for providing heat exchange between the polluted cold gas and the cleaned hot gas. The regenerative heat exchangers (12,15) are filled with a packing of a material suitable to be charged into the furnace (1) generating the gases which are used in the scrap preheating process, or into another nearby furnace. The packing is withdrawn completely or partly when the performance of a heat exchanger has deteriorated as a result of oxidation or clogging with dust. A new packing is supplied to the heat exchanger concerned, and the packing withdrawn is charged into one of said furnaces.

15 Claims, 2 Drawing Sheets

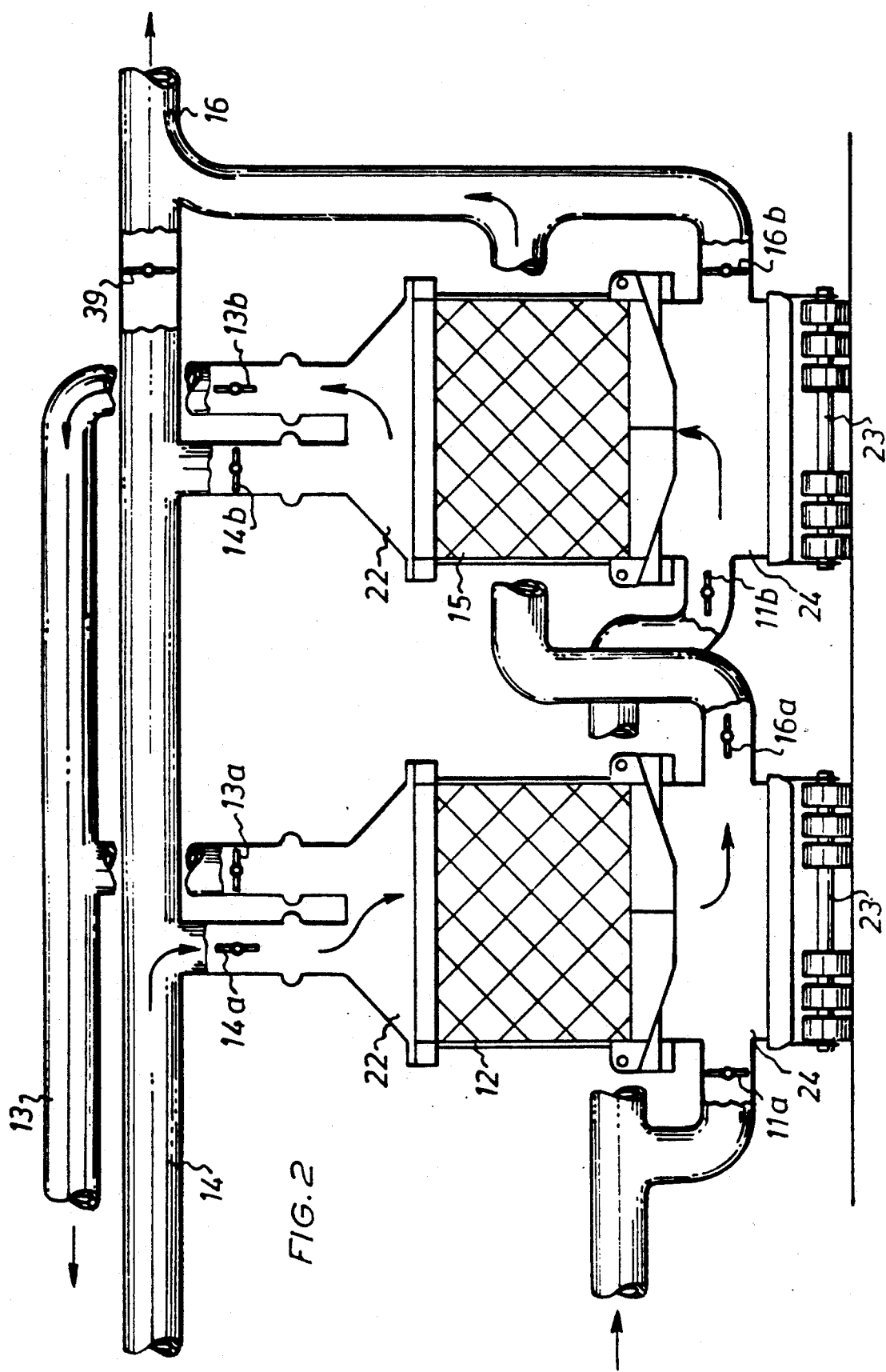

METHOD AND INSTALLATION FOR RECOVERING ENERGY IN METALLURGICAL PROCESSES

TECHNICAL FIELD

The present invention relates to a process for recovering energy in metallurgical processes comprising preheating of scrap, or other processes in association with metallurgical industry where combustible gases, such as hydrocarbons, are generated. The method is especially advantageous when hot gases, e.g. from an electric arc furnace, are conducted through a basket for direct heating of scrap, such as iron, which is polluted with lacquer or oil, these pollutants being entrained in the form of droplets or vapour with the emitted gases.

The present invention also relates to an installation for carrying out the method.

STATE OF THE ART

In many metallurgical processes, there are emissions of hot gases which are often heavily polluted with dust. These hot exhaust gases represent a major part of the energy losses in such processes. Many methods have therefore been suggested in order to reduce the losses of energy, e.g. by transmitting energy from the exhaust gases to the raw material supplied in the process. In certain case, the heat in the exhaust gases may also be used for preheating combustion air or other process gases by means of different types of heat exchangers.

It has long been customary to use regenerative heat exchangers for transmitting energy from an emitted polluted gas to gas being supplied. Recuperative heat exchangers, in which heat is transmitted through a partition, become much more expensive and require/far more maintenance. Also, they often provide lower energy saving.

The regenerative heat exchangers may be either fixed or movable. In the former case, the direction of gas flow is periodically changed so that one and the same heat exchanger will be alternately traversed by incoming and outflowing gas. In the latter case, the heat exchanger material is shifted between the ducts for incoming and outflowing gas, e.g. by a rotary movement.

Regenerative heat exchange thus effected is useful also in other processes involving e.g. thermal oxidation (combustion). One example of this is given in U.S. Pat. No. 3,895,918. Of principle interest also are, inter alia, U.S. Pat. No. 2,121,733 and 3,870,474.

Cooling of process gases leaving e.g. an electro-steel furnace, with the scrap iron which is part of the next charge in the furnace is disclosed e.g. in U.S. Pat. No. 4,666,402.

The heating of scrap with hot gases generally involves the emission of considerable amounts of pollutants. The scrap often contains metal parts which are covered with oil, lacquered or otherwise contaminated with substances which evaporate when heated. The gases leaving the scrap preheating process may thus be a considerable strain on the environment.

Many methods are known for cleaning gases. The technique which generally is best suited for the destruction of e.g. hydrocarbons is thermal combustion, which means heating the polluted gas to such a high temperature that residues of oil and lacquer are combusted and substantially leave only harmless remainders, carbon dioxide and water. One example of this given in EP-A-82304463.1, Publ. No 74214.

To recover energy and, thus, reduce the cost for the destruction of combustible pollutants, it is customary practice to perform heat exchange between the gas supplied to the combustion chamber and the gas leaving the combustion chamber. Examples of this are given in earlier cited U.S. Pat. No. 3,895,918, U.S. Pat. No. 2,121,733 and U.S. Pat. No. 3,870,474.

BRIEF ACCOUNT OF THE PRESENT INVENTION

Technical problem

Heat exchangers, both recuperative and regenerative ones, contain relatively narrow ducts through which e.g. a gas flows. If the gas is polluted, pollutants deposit in these ducts which are successively blocked. In recuperative heat exchangers, this very soon means impaired performance of the heat exchangers. While not being equally sensitive, regenerative heat exchangers, too, suffer from impaired heat transfer capacity and increased flow resistance with increasing soiling.

Above-mentioned U.S. Pat. No. 2,121,733 and U.S. Pat. No. 3,870,474 thus disclose means for continuously removing polluted material from the heat exchangers and supplying them with new or cleaned material. If the removed pollutants can be reused in the process from which they have been removed, they cannot generally be recovered without using complicated washing and purifying apparatuses. If the pollutants are highly adhesive to the heat exchanger bodies or even chemically combine with substances in these bodies, cleaning may prove impossible or be so costly that deposition is preferred. This is a waste of natural resources and should of course be avoided.

Solution of the problem

In order, with improved economy of operation and reduced clogging problems, to recover energy from hot process gases and transmit this energy to cold gases supplied in the same process, the present invention proposes a method relying on regenerative heat exchange.

In this method, hot and cold gases are alternately conducted through two or more beds of packing material. The packing consists of a material supplied in connection with charging in the process from which the hot gases originate or in a suitable nearby process. When the heat exchangers have been soiled to such an extent that they do not operate satisfactorily any more, the packing is removed and charged into the process, and a new packing is supplied to the heat exchangers.

It is of course not necessary that both heat exchangers are emptied simultaneously and, optionally, they are not always completely emptied.

BRIEF DESCRIPTION OF THE DRAWINGS

FIG. 2 is an example of an embodiment of a regenerative heat exchanger having a pair of heat exchanger bodies connected in accordance with the invention.

DESCRIPTION OF A PROPOSED EMBODIMENT

Figure 1:
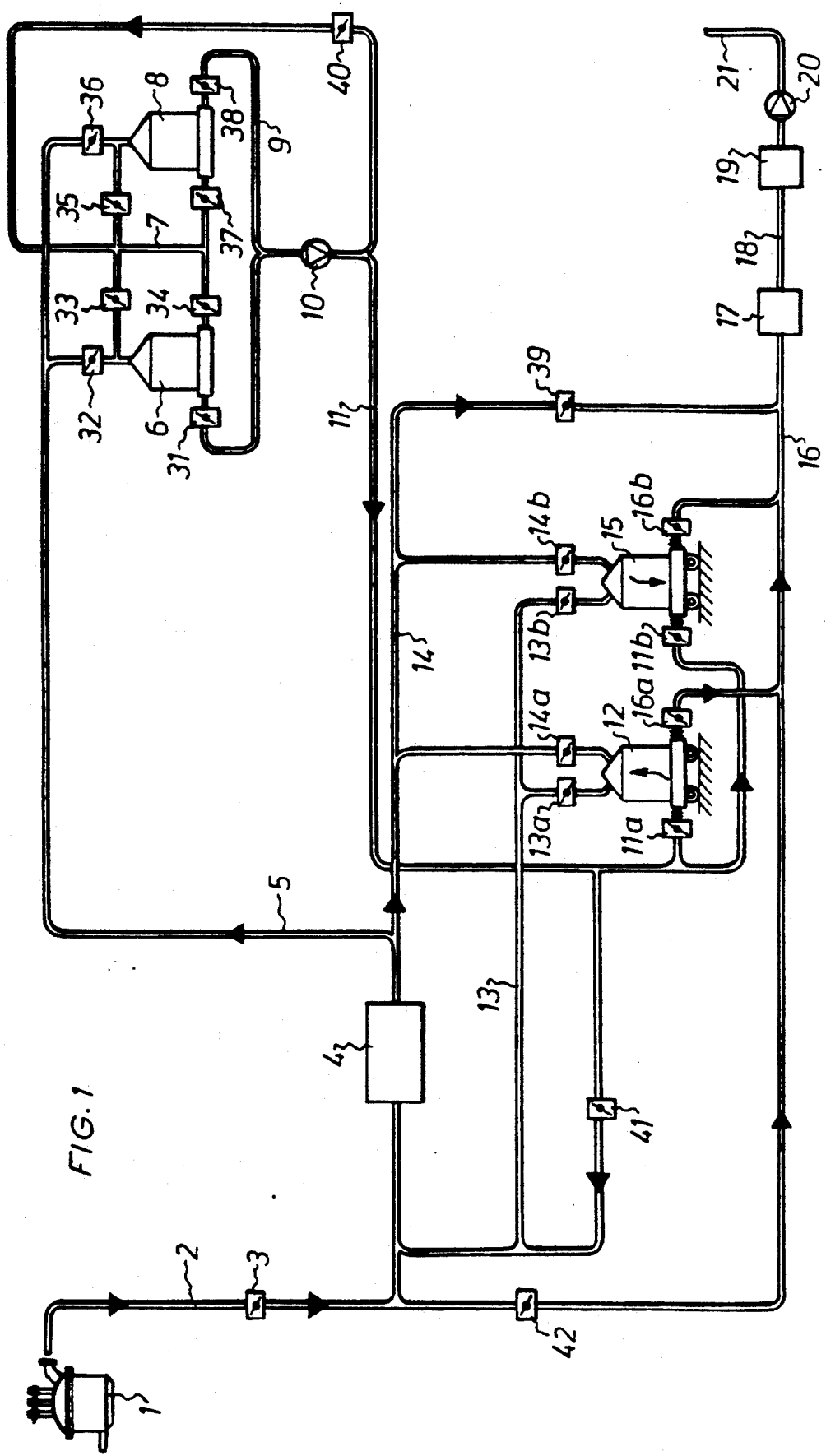
FIG. 1 is a flow diagram of an installation appropriate for carrying out the method according to the invention.

The invention will now be described in more detail with reference to the accompanying drawings.

Hot gases produced in metallurgical furnace, e.g., an electric arc furnace 1 pass through a duct 2 with a regulating throttle 3 to a combustion chamber 4 where they are mixed with gases supplied through a duct 13 from the scrap preheating process and charged with combustible pollutants. In the combustion chamber, these pollutants are burnt and the resulting exhaust gases are conducted, partly through a duct 5 to the scrap preheating process, and partly through a duct 14 for cooling and cleaning prior to emission into the atmosphere.

The part of the gases led through the duct 5 passes through a first scrap basket 6, a duct 7 and a second scrap basket 8, and leaves the scrap preheating process charged with combustible pollutants, through a duct 9, a fan 10 and a duct 11. If so desired, it is of course possible to make such a connection that only one of the scrap baskets 6 and 8 is traversed by the gases.

The cooled and polluted gases pass through the duct 11 to a first additional scrap basket 12 with a previously heated packing for heating the gases. The gases are then led through a duct 13 to the combustion chamber 4 where they are mixed with the hot gases from the electric arc furnace, and the major portion of the pollutants entrained from the scrap preheating process is combusted. Oxygen or air and, if required, additional fuel are supplied to the combustion chamber 4 through suitable means (not shown).

The part of the gases passing from the combustion chamber 4 through the duct 14 flows through a second additional scrap basket 15 containing a previously cooled packing which is heated by the gases, and thereafter passes through a duct 16, a gas cooler 17, a duct 18, a dust filter 19, a fan 20 and a duct 21 and out into the atmosphere. The scrap baskets 12 and 15 form heat exchanger bodies of a regenerative heat exchanger.

The amount of gas passing through the scrap baskets 6 and 8 is adjusted, as required, by means of the fan 10. If, in operation, one of these scrap baskets is emptied, valves 32 through 37 are adjusted so that the gas is passed only through the other scrap basket.

When the contents of the first additional scrap basket 12 have been cooled to a predetermined temperature and/or the contents of the second additional scrap basket 15 have been heated to another predetermined temperature, there is a switch of the function of these two additional scrap baskets, such that the gases from the duct 11 are conducted to the scrap basket 15. The gas from the duct 14 is then instead conducted to the scrap basket 12.

In the former case of operation, the valves 11a, 13a, 14b and 16b are thus open, while the valves 11b, 13b, 14a and 16a are closed. In the latter case of operation, it is the other way round.

In operation, the pressure drop increases successively in the additional scrap baskets 12, 15 because of the deposition of dust and possibly condensed pollutants and also because of oxidation of the packing material. When it is deemed appropriate, the baskets and/or the packing therein are exchanged, all or part of the packing is withdrawn and the withdrawn packing is charged into the arc furnace 1. The packing is scrap suitable to be charged into the metallurgical furnace, preferably scrap iron, or a mixture of scrap iron and limestone or dolomite.

If required, it is possible, by means of valves 31-42, to perform reconnections, e.g. changing the relationship between the scrap baskets 6 and 8 or by-passing one or more of the scrap baskets 6, 8, 12 and 15, when this is justified.

FIG. 2 shows in more detail the additional scrap baskets 12 and 15 with the associated duct system. A detachable top 22 is disposed on top of the scrap basket 12 which is placed on a suction box 24 and a truck 23. The position of the valves corresponds to latter state of operation as described above, when the scrap basket 15 is upstream of the combustion chamber 4 and the scrap basket 12 downstream thereof.

The invention is of course not restricted to the foregoing description thereof which is given by way of example only, but may be varied in many different ways within the scope of the accompanying claims.

We claim:

1. A method for recovering energy in the thermal destruction of pollutants in a gas emitted from a scrap preheating device using hot gases from a metallurgical furnace in which a gas charged with combustible pollutants is emitted from the device and passed through a combustion chamber along with hot gases from the furnace, comprising the steps of conducting a cool gas through one regenerative heat exchanger body and thereafter passing it through said combustion chamber in which the combustible pollutants are destroyed by heating, and conducting said gas through a second regenerative heat exchanger body after passing through said combustion chamber to bring about heat exchange between the gas entering the combustion chamber and the heated gas cleaned of combustible pollutants leaving the combustion chamber;

filling the two regenerative heat exchanger bodies with a packing of a material suitable to be charged into the metallurgical furnace;

withdrawing at least partly said packing when the performance of the heat exchanger has deteriorated as a result of oxidation or clogging with dust; supplying a new packing to replace the withdrawn packing; and charging the withdrawn packing into a metallurgical furnace.

2. Method as claimed in claim 1, including the step of filling the regenerative heat exchanger bodies with scrap to form said packing.

3. Method as claimed in claim 2, wherein the regenerative heat exchanger bodies are filled with a mixture of scrap iron and limestone or dolomite to form said packing.

4. Installation for recovering energy in the thermal destruction of compounds in a gas emitted from a scrap preheating device (6, 8) in an electro-steel furnace 1, the outlet of the electro-steel furnace being connected to the inlet of one or more scrap baskets (6, 8) the outlets of which are connectible via one of two or more alternately connectible regenerative heat exchangers (15, 12), to a combustion chamber (4) the outlet of which is connectible, via another of said regenerative heat exchangers (12, 15) and an optional gas cleaning system (17, 19), to means (21) for emission into the atmosphere, characterised in that the heatabsorbing packing of the regenerative heat exchangers are scrap baskets (12, 15) which are disposed on suction boxes (24) or in basket racks and are provided with removable tops (22).

5. Installation as claimed in claim 4, including mobile means mounting said scrap baskets with subjacent suction boxes.

6. Method as claimed in claim 1, wherein said metallurgical furnace is an electro-steel furnace issuing hot gases, including the step of mixing the gas form the one heat exchanger body with said hot gases form the furnace before passing it through said combustion chamber.

7. Method as claimed in claim 1, wherein said withdrawn packing is charged into the furnace which passes hot gases to said combustion chamber.

8. Method as claimed in claim 2, wherein said scrap is scrap iron.

9. Installation for recovering energy in the thermal destruction of compounds in a gas emitted from a scrap preheating device in an electro-steel furnace, said preheating device comprising at least one scrap basket, at least two regenerative heat exchanger bodies and a combustion chamber, the outlet of the electro-steel furnace being connected to the inlet of said scrap basket, the outlet of which having alternative connections through one of said regenerative heat exchanger bodies to the inlet of said combustion chamber, the outlet of which is connected, via another of said regenerative heat exchanger bodies to means for emission into the atmosphere, said regenerative heat exchanger bodies having scrap baskets serving as heat exchange bodies, and operable to receive scrap for charging said electro-steel furnace.

10. Installation as claimed in claim 9 wherein said preheating device comprises a pair of scrap baskets with means to alternatively connect said furnace to either one or both of said baskets.

11. Installation as claimed in claim 9 including a gas-cleaning system between said other of said heat exchanger bodies and said means for emission into the atmosphere.

12. Installation as claimed in claim 9 including suction boxes underlying said heat exchanger baskets, and removable tops on said baskets.

13. Installation as claimed in claim 5 wherein said mobile means comprise trucks.

14. Installation as claimed in claim 9 including basket racks mounting said heat exchanger baskets.

15. Installation according to claim 9 wherein said heat exchanger bodies are fixed and including valve means to periodically reverse the connections of the inlet and outlet of said combustion chamber to said regenerative heat exchanger bodies for regenerating the heat exchanger.

* * * * *

UNITED STATES PATENT AND TRADEMARK OFFICE
CERTIFICATE OF CORRECTION

PATENT NO. : 5,074,906

DATED : December 24, 1991

INVENTOR(S) : Staffan Granstrom and Sten Holmlund

It is certified that error appears in the above-identified patent and that said Letters Patent is hereby corrected as shown below:

Column 5, line 1, "form" should be --from--;

Column 5, line 2, "form" should be --from--.

Signed and Sealed this

Twenty-fifth Day of May, 1993

Attest:

MICHAEL K. KIRK

Attesting Officer

Acting Commissioner of Patents and Trademarks